US012650604B2

(12) United States Patent
Kirillov

(10) Patent No.: US 12,650,604 B2
(45) Date of Patent: Jun. 9, 2026

(54) MULTIPLE VIRTUAL PLANE PROJECTOR FOR HEAD-UP DISPLAY

(71) Applicant: Infineon Technologies AG, Neubiberg (DE)

(72) Inventor: Boris Kirillov, Gratwein-Straßengel (AT)

(73) Assignee: Infineon Technologies AG, Neubiberg (DE)

( * ) Notice: Subject to any disclaimer, the term of this patent is extended or adjusted under 35 U.S.C. 154(b) by 434 days.

(21) Appl. No.: 18/484,925

(22) Filed: Oct. 11, 2023

(65) Prior Publication Data

US 2025/0123493 A1      Apr. 17, 2025

(51) Int. Cl.
G02B 27/01        (2006.01)
G02B 27/09        (2006.01)
(52) U.S. Cl.
CPC ..... G02B 27/0189 (2013.01); G02B 27/0922 (2013.01); G02B 27/0955 (2013.01); *G02B 2027/0187* (2013.01); *G02B 2027/0198* (2013.01)
(58) Field of Classification Search
CPC ............ G02B 27/0189; G02B 27/0922; G02B 27/0955; G02B 2027/0187; G02B 2027/0198; G02B 2027/0127; G02B 26/101; G02B 27/0101; G02B 26/0833; G02B 26/0816; G02B 30/40; G02B 30/56; G02B 2027/0161; G02F 1/294
See application file for complete search history.

(56) References Cited

U.S. PATENT DOCUMENTS

| | | | |
|---|---|---|---|
| 11,378,799 | B1 | 7/2022 | Gu et al. |
| 2019/0129196 | A1* | 5/2019 | Masson ............... G02B 26/105 |
| 2022/0055479 | A1 | 2/2022 | Qin et al. |

FOREIGN PATENT DOCUMENTS

| | | | |
|---|---|---|---|
| CN | 115469461 A | 12/2022 | |
| EP | 4137875 A1 | 2/2023 | |
| WO | WO-2023185653 A1 * | 10/2023 | ......... G02B 27/0101 |

* cited by examiner

*Primary Examiner* — Thomas K Pham
*Assistant Examiner* — Jennifer A Jones
(74) *Attorney, Agent, or Firm* — Harrity & Harrity, LLP

(57)        ABSTRACT

A head-up display (HUD) system includes a first light transmitter configured to transmit first light beams on a first optical path; a second light transmitter configured to transmit second light beams on a second optical path; a two-dimensional (2D) scanner arranged on the first optical path and the second optical path; a first focus lens, arranged on the first optical path between the first light transmitter and the 2D scanner, configured to focus the first light beams onto a first focal point located at a first distance downstream from the 2D scanner along the first optical path; and a second focus lens, arranged on the second optical path between the second light transmitter and the 2D scanner, configured to focus the second light beams onto a second focal point located at a second, different distance downstream from the 2D scanner along the second optical path.

20 Claims, 3 Drawing Sheets

100 →

100

MULTIPLE VIRTUAL PLANE PROJECTOR FOR HEAD-UP DISPLAY

BACKGROUND

Augmented reality (AR) is a technology that provides an interactive user-experience that combines real-world and computer-generated content. AR delivers visual elements, sound, haptics, and/or other sensory information to a user in order to alter the user's ongoing perception of a real-world environment in real-time. In other words, AR adds digital elements to a live experience of the real-world environment. The sensory information overlaid with the real-world environment can be constructive in order to add the sensory information to the real-world environment, or destructive in order to mask part of the real-world environment. The sensory information may be delivered to the user through a device, such as a mobile device. For example, a perceived part of the real-world environment may be augmented with digital information that is superimposed thereon. In some cases, visual content may be superimposed onto the user's line-of-sight (e.g., a user's real-world view). Thus, digital content may be overlaid onto the perceived part of the environment to visually provide additional information to the user. The digital content may be displayed on a transparent substrate or display, such as smart eye-glasses, smart contact lenses, head-up displays (HUDs), and head-mounted displays (HMDs), or projected directly onto a user's retina, as is the case for virtual retinal displays.

SUMMARY

In some implementations, a HUD system includes a first light transmitter configured to generate a first plurality of light beams corresponding to a first image and transmit the first plurality of light beams on a first optical path; a second light transmitter configured to generate a second plurality of light beams corresponding to a second image and transmit the second plurality of light beams on a second optical path; a two-dimensional (2D) scanner arranged on the first optical path and the second optical path, wherein the 2D scanner is configured to receive the first plurality of light beams from the first light transmitter and steer the first plurality of light beams along the first optical path according to a 2D scanning pattern, and wherein the 2D scanner is configured to receive the second plurality of light beams from the second light transmitter and steer the second plurality of light beams along the second optical path according to the 2D scanning pattern; a first focus lens arranged on the first optical path between the first light transmitter and the 2D scanner, wherein the first focus lens is configured to focus each light beam of the first plurality of light beams onto a first focal point located at a first distance downstream from the 2D scanner along the first optical path; and a second focus lens arranged on the second optical path between the second light transmitter and the 2D scanner, wherein the second focus lens is configured to focus each light beam of the second plurality of light beams onto a second focal point located at a second distance downstream from the 2D scanner along the second optical path, and wherein the first distance and the second distance are different.

In some implementations, a HUD system includes a first light transmitter configured to generate a first plurality of light beams corresponding to a first virtual plane and transmit the first plurality of light beams on a first optical path, wherein the first virtual plane is located at a first virtual image distance at which a first image is to be perceived; a second light transmitter configured to generate a second plurality of light beams corresponding to a second virtual plane and transmit the second plurality of light beams on a second optical path, wherein the second virtual plane is located at a second virtual image distance at which a second image is to be perceived, and wherein the second virtual image distance is different from the first virtual image distance; a 2D scanner arranged on the first optical path and the second optical path, wherein the 2D scanner is configured to receive the first plurality of light beams from the first light transmitter and steer the first plurality of light beams along the first optical path according to a 2D scanning pattern, and wherein the 2D scanner is configured to receive the second plurality of light beams from the second light transmitter and steer the second plurality of light beams along the second optical path according to the 2D scanning pattern; a HUD reflector; and at least one diffuser arranged at a first focal point of the first plurality of light beams and at a second focal point of the second plurality of light beams, wherein the at least one diffuser is configured to receive the first plurality of light beams from the 2D scanner and diffuse the first plurality of light beams onto the HUD reflector, wherein the at least one diffuser is configured to receive the second plurality of light beams from the 2D scanner and diffuse the second plurality of light beams onto the HUD reflector, wherein the HUD reflector is configured to project the first plurality of light beams received from the at least one diffuser onto the first virtual plane to render the first image to be perceived at the first virtual image distance, and wherein the HUD reflector is configured to project the second plurality of light beams received from the at least one diffuser onto the second virtual plane to render the second image to be perceived at the second virtual image distance.

BRIEF DESCRIPTION OF THE DRAWINGS

Implementations are described herein making reference to the appended drawings.

DETAILED DESCRIPTION

Figure 1:
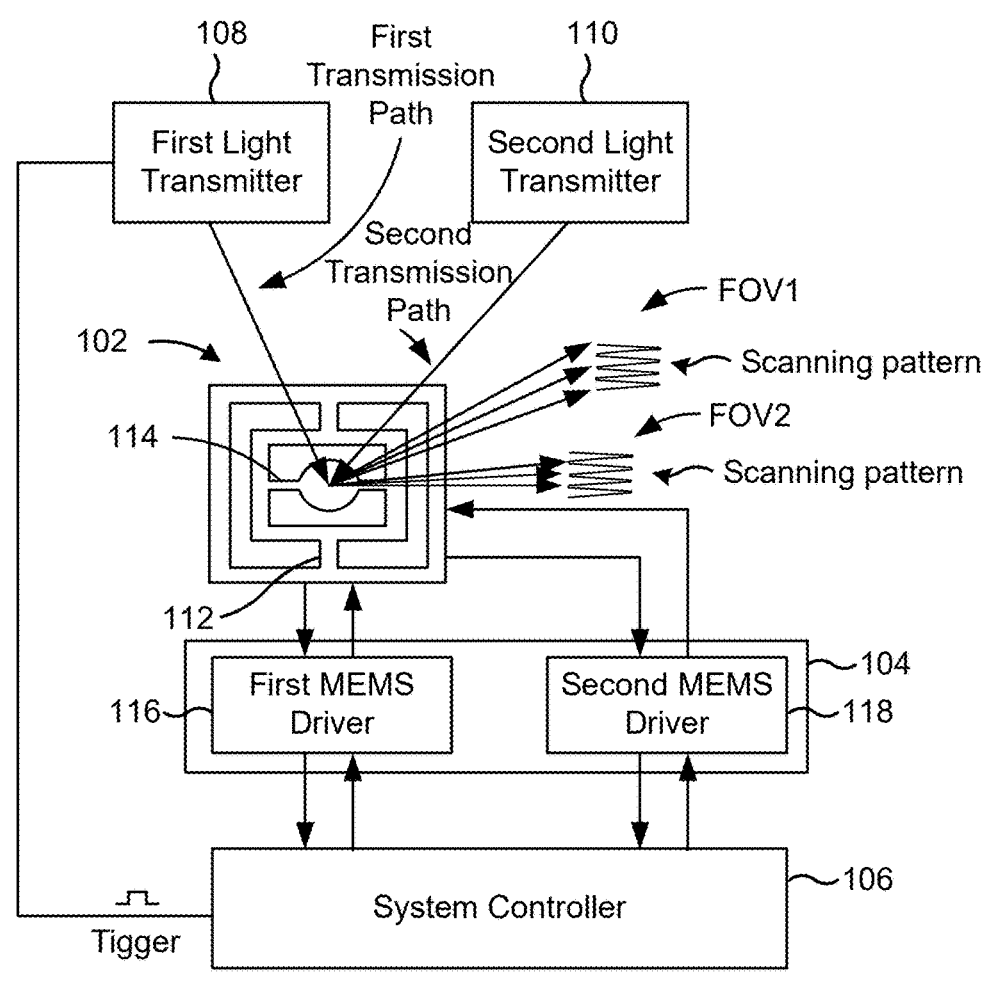
FIG. 1 shows a schematic block diagram of a two-dimensional (2D) scanning system according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A HUD, sometimes referred to as a heads-up display, is any transparent display that presents data without requiring users to look away from their usual viewpoints. For example, a HUD may be used in a vehicle to display images on a windshield. The HUD can provide a more pleasant driving experience. In addition, the HUD may be provided as a safety feature to enable a driver to operate the vehicle more safely. An image quality and a fidelity of image generation is of paramount importance in such applications where the image quality and fidelity directly affects a safety of vehicle operation. Such applications are also cost sensitive.

While operating a vehicle, a driver typically observes two or more sources of visual information. A visual information from a first source may be generated at a near-distance (e.g., a first virtual distance) by a display integrated in a dashboard. The first source of visual information typically includes information that corresponds to the operation of the vehicle, such as information provided by an odometer, a fuel gauge, a plurality of status indicators, and so forth. A visual information from a second source may be observed at a far-distance (e.g., a second virtual distance, such as optical infinity) outside of the vehicle. For example, the second source of visual information may be a real-world environment observed by the driver. As a result, the driver's focus may switch between different near-field and far-field sources of visual information. If a projection plane of an image generated by a HUD is not aligned with the driver's focus, the image may appear blurry and/or distorted. Thus, projecting overlaying information by a HUD should be performed in alignment with the driver's focus in order to maintain high image quality and high fidelity.

Some implementations disclosed herein are directed to a HUD system that takes into account multiple virtual distances for generating images that are to be presented to a driver. For example, the HUD system may include a multi-source laser beam scanning display system that provides flexibility for tuning a location of projected information that is provided to the driver, while minimizing manufacturing costs. The HUD system may include two or more red-green-blue (RGB) laser modules that share a single 2D scanner and a single display controller. The HUD system may be configured to generate images at multiple virtual distances, with each RGB laser module corresponding to one of the multiple virtual distances. Thus, different RGB laser modules may be configured to project images at different virtual distances in alignment with different focus areas of the driver. As a result, projected images may be generated in focus with a particular viewing direction of the driver, with some projected images being generated for near-field virtual distances and some projected images being generated for far-field virtual distances. Each projected image can be generated with a high image quality and a high fidelity for a particular virtual distance. Additionally, since the two or more RGB laser modules share a single 2D scanner and a single display controller, manufacturing costs can be kept relatively low.

FIG. 1 shows a schematic block diagram of a 2D scanning system 100 according to one or more implementations. In particular, the 2D scanning system 100 includes a micro-electromechanical system (MEMS) mirror 102 implemented as a single scanning structure that is configured to steer or otherwise deflect light beams according to a 2D scanning pattern. The 2D scanning system 100 further includes a MEMS driver system 104, a system controller 106, a first light transmitter 108, and a second light transmitter 110.

In the example shown in FIG. 1, the MEMS mirror 102 is a mechanical moving mirror (e.g., a MEMS micro-mirror) integrated on a semiconductor chip (not shown). The MEMS mirror 102 is configured to rotate or oscillate via rotation about two scanning axes that are typically orthogonal to each other. For example, the two scanning axes may include a first scanning axis 112 that enables the MEMS mirror 102 to steer light in a first scanning direction (e.g., an x-direction) and a second scanning axis 114 that enables the MEMS mirror 102 to steer light in a second scanning direction (e.g., a y-direction). As a result, the MEMS mirror 102 can direct light beams in two dimensions according to the 2D scanning pattern and may be referred to as a 2D MEMS mirror.

A scan can be performed to illuminate an area referred to as a field-of-view. The scan, such as an oscillating horizontal scan (e.g., from left to right and right to left of a field-of-view), an oscillating vertical scan (e.g., from bottom to top and top to bottom of a field-of-view), or a combination thereof (e.g., a Lissajous scan or a raster scan), can illuminate the field-of-view in a continuous scan fashion. By emitting successive light beams in different scanning directions, an image can be projected into the field-of-view, as is the case in AR technologies. In other words, the field-of-view can be illuminated by a scanning operation. In general, the field-of-view represents a scanning area at which the successive light beams are projected. The field-of-view can also be referred to as a field of illumination or as a projection area in a projection plane onto which an image is projected.

The MEMS mirror 102 can direct a particular light beam at a desired 2D coordinate (e.g., an x-y coordinate) in the field-of-view. The desired 2D coordinate may correspond to an image pixel of a projected image, with different 2D coordinates corresponding to different image pixels of the projected image. Accordingly, multiple light beams transmitted at different transmission times can be steered by the MEMS mirror 102 at the different 2D coordinates of the field-of-view in accordance with the 2D scanning pattern. The MEMS mirror 102 can be used to scan the field-of-view in both scanning directions by changing an angle of deflection of the MEMS mirror 102 on each of the first scanning axis 112 and the second scanning axis 114.

A rotation of the MEMS mirror 102 on the first scanning axis 112 may be performed between two predetermined extremum deflection angles (e.g., +/−5 degrees, +/−15 degrees, etc.). Likewise, a rotation of the MEMS mirror 102 on the second scanning axis 114 may be performed between two predetermined extremum deflection angles (e.g., +/−5 degrees, +/−15 degrees, etc.). In some implementations, depending on the 2D scanning pattern, the two predetermined extremum deflection angles used for the first scanning axis 112 may be the same as the two predetermined extremum deflection angles used for the second scanning axis 114. In some implementations, depending on the 2D scanning pattern, the two predetermined extremum deflection angles used for the first scanning axis 112 may be different from the two predetermined extremum deflection angles used for the second scanning axis 114.

In some implementations, the MEMS mirror 102 can be a resonator (e.g., a resonant MEMS mirror) configured to oscillate side-to-side about the first scanning axis 112 at a first frequency (e.g., a first resonance frequency) and configured to oscillate side-to-side about the second scanning axis 114 at a second frequency (e.g., a second resonance frequency). Thus, the MEMS mirror 102 can be continuously driven about the first scanning axis 112 and the second scanning axis 114 to perform a continuous scanning operation. As a result, light beams reflected by the MEMS mirror 102 are scanned into the field-of-view in accordance with the 2D scanning pattern.

Different frequencies or a same frequency may be used for the first scanning axis 112 and the second scanning axis 114 for defining the 2D scanning pattern. For example, a raster scanning pattern or a Lissajous scanning pattern may be achieved by using different frequencies for the first frequency and the second frequency. Raster scanning and Lissajous scanning are two types of scanning that can be implemented in display applications, light scanning applications, and light steering applications, to name a few. As an example, Lissajous scanning is typically performed using two resonant scanning axes which are driven at different constant scanning frequencies with a defined fixed frequency ratio therebetween that forms a specific Lissajous pattern and frame rate. In order to properly carry out the Lissajous scanning and the raster scanning, synchronization of the two scanning axes is performed by the system controller 106 in conjunction with transmitting timings of the first light transmitter 108 and the second light transmitter 110.

For each respective scanning axis, including the first scanning axis 112 and the second scanning axis 114, the MEMS mirror 102 includes an actuator structure used to drive the MEMS mirror 102 about the respective scanning axis. Each actuator structure may include interdigitated finger electrodes made of interdigitated mirror combs and frame combs to which a drive voltage (e.g., an actuation signal or driving signal) is applied by the MEMS driver system 104. Applying a difference in electrical potential between interleaved mirror combs and frame combs creates a driving force between the mirror combs and the frame combs, which creates a torque on a mirror body of the MEMS mirror 102 about the intended scanning axis. The drive voltage can be toggled between two voltages resulting in an oscillating driving force. The oscillating driving force causes the MEMS mirror 102 to oscillate back and forth on the respective scanning axis between two extrema. Depending on the configuration, this actuation can be regulated or adjusted by adjusting the drive voltage off time, a voltage level of the drive voltage, or a duty cycle.

In other examples, the MEMS mirror 102 may use other actuation methods to drive the MEMS mirror 102 about the respective scanning axes. For example, these other actuation methods may include electromagnetic actuation and/or piezoelectric actuators. In electromagnetic actuation, the MEMS mirror 102 may be immersed in a magnetic field and an alternating electric current through conductive paths may create the oscillating torque around the scanning axis. Piezoelectric actuators may be integrated in leaf springs of the MEMS mirror 102 or the leaf springs may be made of piezoelectric material to produce alternating beam bending forces in response to an electrical signal and generate the oscillation torque.

The MEMS driver system 104 is configured to generate driving signals (e.g., actuation signals) to drive the MEMS mirror 102 about the first scanning axis 112 and the second scanning axis 114. In particular, the MEMS driver system 104 is configured to apply the driving signals to the actuator structure of the MEMS mirror 102. In some implementations, the MEMS driver system 104 includes a first MEMS driver 116 configured to drive the MEMS mirror 102 about the first scanning axis 112 and a second MEMS driver 118 configured to drive the MEMS mirror 102 about the second scanning axis 114. The first MEMS driver 116 may be configured to sense a first rotational position of the MEMS mirror 102 about the first scanning axis 112 and provide first position information indicative of the first rotational position (e.g., tilt angle or degree of rotation about the first scanning axis 112) to the system controller 106. Similarly, the second MEMS driver 118 may be configured to sense a second rotational position of the MEMS mirror 102 about the second scanning axis 114 and provide second position information indicative of the second rotational position (e.g., tilt angle or degree of rotation about the second scanning axis 114) to the system controller 106.

The system controller 106 may use the first position information and the second position information to trigger light beams at the first light transmitter 108 and the second light transmitter 110. For example, the system controller 106 may use the first position information and the second position information to set a transmission time of first light transmitter 108 and the second light transmitter 110 in order to target a particular 2D coordinate of the 2D scanning pattern of the MEMS mirror 102. Thus, a higher accuracy in position sensing of the MEMS mirror 102 by the first MEMS driver 116 and the second MEMS driver 118 may result in the system controller 106 providing more accurate and precise control of other components of the 2D scanning system 100.

As noted above, the first MEMS driver 116 and the second MEMS driver 118 may apply a drive voltage to a corresponding actuator structure of the MEMS mirror 102 as the driving signal to drive a rotation (e.g., an oscillation) of the MEMS mirror 102 about a respective scanning axis (e.g., the first scanning axis 112 or the second scanning axis 114). The drive voltage can be switched or toggled between a high-voltage (HV) level and a low-voltage (LV) level resulting in an oscillating driving force. In some implementations, the LV level may be zero (e.g., the drive voltage is off), but is not limited thereto and could be a non-zero value. When the drive voltage is toggled between an HV level and an LV level and the LV level is set to zero, it can be said that the drive voltage is toggled on and off (HV on/off). The oscillating driving force causes the MEMS mirror 102 to oscillate back and forth on the first scanning axis 112 or the second scanning axis 114 between two extrema. The drive voltage may be a constant drive voltage, meaning that the drive voltage is the same voltage when actuated (e.g., toggled on) or one or both of the HV level or the LV level of the drive voltage may be adjustable. However, it will be understood that the drive voltage is being toggled between the HV level and the LV level in order to produce the mirror oscillation. Depending on a configuration, this actuation can be regulated or adjusted by the system controller 106 by adjusting the drive voltage off time, a voltage level of the drive voltage, or a duty cycle. As noted above, frequency and phase of the drive voltage can also be regulated and adjusted.

In some implementations, the system controller 106 is configured to set a driving frequency of the MEMS mirror 102 for each scanning axis and is capable of synchronizing the oscillations about the first scanning axis 112 and the second scanning axis 114. In particular, the system controller 106 may be configured to control an actuation of the MEMS mirror 102 about each scanning axis by controlling the driving signals. The system controller 106 may control the frequency, the phase, the duty cycle, the HV level, and/or the LV level of the driving signals to control the actuations about the first scanning axis 112 and the second scanning axis 114. The actuation of the MEMS mirror 102 about a particular scanning axis controls its range of motion and scanning rate about that particular scanning axis.

For example, to make a Lissajous scanning pattern reproduce itself periodically with a frame rate frequency, the first scanning axis 112 and the second scanning axis 114 are each driven at a target scanning frequency f1, f2, respectively, with a defined frequency ratio or defined frequency difference therebetween that forms a repeatable Lissajous pattern (frame) with a frame rate. A new frame begins each time the Lissajous scanning pattern restarts, which may occur when a phase difference between a mirror phase about the first scanning axis 112 and a mirror phase about the second scanning axis 114 is zero. The system controller 106 may synchronize the oscillations about the first scanning axis 112 and the second scanning axis 114 to ensure this defined frequency ratio or defined frequency difference is maintained based on the first position information and the second position information received from the first MEMS driver 116 and the second MEMS driver 118, respectively.

The 2D scanning system 100 includes two or more light transmitters, including the first light transmitter 108 and the second light transmitter 110. The first light transmitter 108 and the second light transmitter 110 may be RGB light transmitters having red (R), green (G), and blude (B) light sources configured to generate RGB light beams. For example, the first light transmitter 108 may include a first red laser diode or light emitting diode for generating a first red light beam, a first green laser diode or light emitting diode for generating a first green light beam, a first blue laser diode or light emitting diode for generating a first blue light beam, and first optical elements that combine the three colored light beams into an RGB light beam for output from the first light transmitter 108. Accordingly, the first light transmitter 108 is configured to transmit each RGB light beam on a first transmission path toward the MEMS mirror 102. Each RGB light beam may be generated as a light pulse and the first light transmitter 108 may sequentially transmit multiple RGB light beams as the MEMS mirror 102 changes its transmission direction in order to target different 2D coordinates. A transmission sequence of the multiple RGB light beams and a timing thereof may be implemented by the first light transmitter 108 according to a trigger signal received from the system controller 106.

Similarly, the second light transmitter 110 may include a second red laser diode or light emitting diode for generating a second red light beam, a second green laser diode or light emitting diode for generating a second green light beam, a second blue laser diode or light emitting diode for generating a second blue light beam, and second optical elements that combine the three colored light beams into an RGB light beam for output from the second light transmitter 110. Accordingly, the second light transmitter 110 is configured to transmit each RGB light beam on a second transmission path toward the MEMS mirror 102. Each RGB light beam may be generated as a light pulse and the second light transmitter 110 may sequentially transmit multiple RGB light beams as the MEMS mirror 102 changes its transmission direction in order to target different 2D coordinates. A transmission sequence of the multiple RGB light beams and a timing thereof may be implemented by the second light transmitter 110 according to a trigger signal received from the system controller 106.

It is to be noted that a particular RGB light beam may be made of a single color of light, a combination of two colors of light, or a combination of all three colors or light. For example, the system controller 106 may control which R, G, B light sources of a particular RGB light transmitter is triggered for a light transmission, including some or all of the R, G, B light sources. While some of the R, G, B light sources may remain inactive during a light transmission, an output light beam may still be referred to as an RGB light beam (e.g., despite not including all three colors of light). Alternatively, an "RGB light beam" may be referred to as a "pixel light beam" that includes one or more colors of light depending on the desired pixel color to be projected into a corresponding field-of-view. Thus, the terms "RGB light beam" and "pixel light beam" can be used interchangeably.

The MEMS mirror 102 is shared by the first transmission path and the second transmission path such that the MEMS mirror 102 receives the RGB light beams generated by the first light transmitter 108 and receives the RGB light beams generated by the second light transmitter 110. Accordingly, the MEMS mirror 102 is configured to steer the RGB light beams from the first light transmitter 108 and the second light transmitter 110 in both scanning directions according to the 2D scanning pattern.

Using the MEMS mirror 102 as a single MEMS mirror that is used for steering both the RGB light beams generated by the first light transmitter 108 and the RGB light beams generated by the second light transmitter 110 saves power by reducing a number of components. In addition, using the MEMS mirror 102 as the single MEMS mirror reduces complexity of the 2D scanning system 100, which can relax synchronization requirements of the 2D scanning system 100 and improve synchronization between a stereoscopic image generated by the first light transmitter 108 and a stereoscopic image generated by the second light transmitter 110.

The MEMS mirror 102 is configured to project the RGB light beams received from the first light transmitter 108 into a first field-of-view FOV1 (e.g., onto a first virtual plane located at a first virtual distance) and project the RGB light beams received from the second light transmitter 110 into a second field-of-view FOV2 (e.g., onto a second virtual plane located at a second virtual distance). The RGB light beams from the first light transmitter 108 and the second light transmitter 110 are separated into two different field-of-views, the first field-of-view FOV1 and the second field-of-view FOV2. For example, additional optical components may be provided along the first transmission path and the second transmission path such that the RGB light beams from the first light transmitter 108 and the second light transmitter 110 are projected onto different virtual planes located at different virtual distances. However, because the MEMS mirror 102 is shared by the first transmission path and the second transmission path, the RGB light beams from the first light transmitter 108 and the second light transmitter 110 follow the same 2D scanning pattern.

Using the MEMS mirror 102 as the single MEMS mirror ensures that the 2D scanning pattern used for steering the RGB light beams generated by the first light transmitter 108 is identical to the 2D scanning pattern used for steering the RGB light beams generated by the second light transmitter 110.

The system controller 106 is configured to control components of the 2D scanning system 100. In certain applications, the system controller 106 may also be configured to receive programming information with respect to the 2D scanning pattern and control a timing of the RGB light beams generated by the first light transmitter 108 and the second light transmitter 110 based on the programming information. Thus, the system controller 106 may include both processing and control circuitry that is configured to generate control signals for controlling the first light transmitter 108, the second light transmitter 110, the first MEMS driver 116, and the second MEMS driver 118.

In some implementations, the system controller 106 is configured to generate one or more trigger signals used to trigger the first light transmitter 108 and the second light transmitter 110 to generate the RGB light beams. The system controller 106 is configured to set the driving frequencies of the MEMS mirror 102 for the first scanning axis 112 and the second scanning axis 114 and is capable of synchronizing the oscillations about the first scanning axis 112 and the second scanning axis 114 to generate the 2D scanning pattern. The system controller 106 can also control the transmission times of the RGB light beams of the first light transmitter 108 and the second light transmitter 110 to achieve a desired illumination pattern that produces images within the respective fields-of-view. The desired illumination pattern is produced by a combination of the 2D scanning pattern produced by the MEMS mirror 102 and the transmission times triggered by the system controller 106. As indicated above, FIG. 1 is provided as an example. Other examples may differ from what is described with regard to FIG. 1. In practice, the 2D scanning system 100 may include additional components, fewer components, different components, or differently arranged components than those shown in FIG. 1 without deviating from the disclosure provided above. The 2D scanning system 100 may be implemented in various types of image projection systems that use two or more different virtual planes on which images are projected. Additionally, two or more components shown in FIG. 1 may be implemented within a single component, or a single component shown in FIG. 1 may be implemented as multiple, distributed components. Additionally, or alternatively, a set of components (e.g., one or more components) of the 2D scanning system 100 may perform one or more functions described as being performed by another set of components of the 2D scanning system 100.

Figure 2:
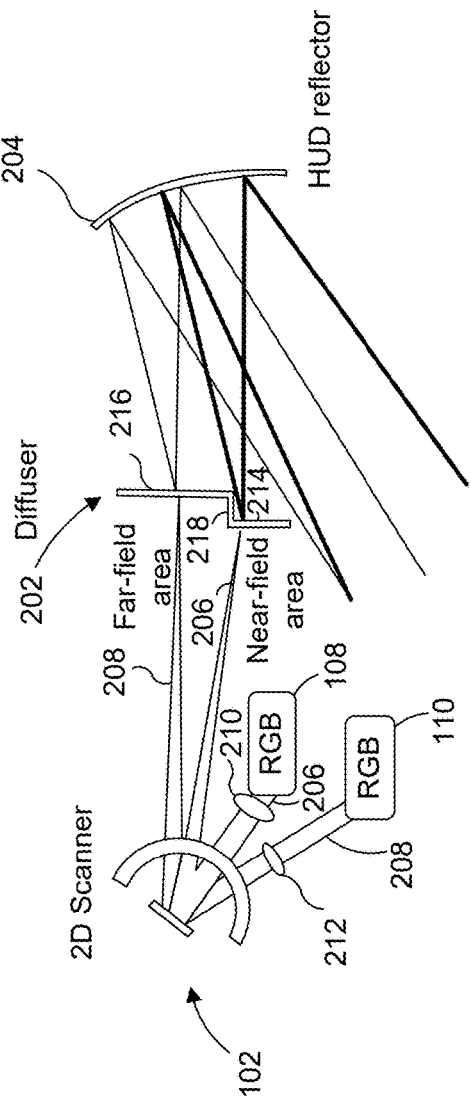
FIG. 2 shows a schematic block diagram of a HUD system according to one or more implementations.

FIG. 2 shows a schematic block diagram of a HUD system 200 according to one or more implementations. The HUD system 200 may include the 2D scanning system 100 described in connection with FIG. 1. The HUD system 200 may include the first light transmitter 108 and the second light transmitter 110. Additionally, the HUD system 200 may include the MEMS mirror 102 that is implemented as a 2D scanner. Additionally, the HUD system 200 may include a diffuser 202 and a HUD reflector 204.

The first light transmitter 108 may generate a first plurality of light beams corresponding to a first image and transmit the first plurality of light beams on a first optical path 206. The second light transmitter 110 may generate a second plurality of light beams corresponding to a second image and transmit the second plurality of light beams on a second optical path 208. The first plurality of light beams and the second plurality of light beams may be collimated beams of pixel light. The MEMS mirror 102 is arranged on the first optical path 206 and the second optical path 208. Thus, the MEMS mirror 102 may receive the first plurality of light beams from the first light transmitter 108 and steer the first plurality of light beams along the first optical path 206 according to a 2D scanning pattern. Similarly, the MEMS mirror 102 may receive the second plurality of light beams from the second light transmitter 110 and steer the second plurality of light beams along the second optical path 208 according to the same 2D scanning pattern.

The HUD system 200 may further include a first focus lens 210 and a second focus lens 212. The first focus lens 210 may be arranged on the first optical path 206 between the first light transmitter 108 and the MEMS mirror 102. The first focus lens 210 may be configured to focus each light beam of the first plurality of light beams onto a first focal point located at a first distance downstream from the MEMS mirror 102 along the first optical path 206. The second focus lens 212 may be arranged on the second optical path 208 between the second light transmitter 110 and the MEMS mirror 102. The second focus lens 212 may be configured to focus each light beam of the second plurality of light beams onto a second focal point located at a second distance downstream from the MEMS mirror 102 along the second optical path 208.

The first distance and the second distance are different distances. For example, in some implementations, the first focus lens 210 may have a first focal length and the second focus lens 212 may have a second focal length that is different from the first focal length. In this example, a distance from the first light transmitter 108 to the first focus lens 210 may be equal to a distance from the second light transmitter 110 to the second focus lens 212. Alternatively, in some implementations, the first focus lens 210 and the second focus lens 212 may have a same focal length. In this example, the first focus lens 210 may be arranged at a third distance from the first light transmitter 108, and the second focus lens 212 may be arranged at a fourth distance from the second light transmitter 110, with the third distance being different from the fourth distance. As a result, the first focal point and the second focal point may be located at different distances.

In some implementations, the first focus lens 210 may be arranged on the first optical path 206 between the MEMS mirror 102 and the diffuser 202. Additionally, or alternatively, the second focus lens 212 may be arranged on the second optical path 208 between the MEMS mirror 102 and the diffuser 202.

The diffuser 202 may be arranged at the first focal point and at the second focal point. For example, the diffuser 202 may have a first diffuser portion 214 arranged at the first focal point and a second diffuser portion 216 arranged at the second focal point. In other words, the diffuser 202 may be a single diffuser structure that includes the first diffuser portion 214, the second diffuser portion 216, and a transition portion 218 (e.g., a step portion) that is connected to the first diffuser portion 214 and the second diffuser portion 216. The transition portion 218 may extend from the first diffuser portion 214 to the second diffuser portion 216 with a dimension that is equal to a difference between the first focal point and the second focal point. Alternatively, the diffuser 202 may include a first diffuser arranged at the first focal point and a second diffuser arranged at the second focal point. In other words, the first diffuser portion 214 and the second diffuser portion 216 may be implemented as separate diffuser structures.

The first diffuser portion 214 may receive the first plurality of light beams from the MEMS mirror 102 and diffuse (e.g., spread) the first plurality of light beams onto the HUD reflector 204. The first diffuser portion 214 may convert the first plurality of light beams into divergent light beams by diffusion, by scattering, or by other means. Thus, the first diffuser portion 214 may be used to increase an eye-box size corresponding to the first image. The eye-box is an area in which a user may observe a projected image, corresponding to eye position. The second diffuser portion 216 may receive the second plurality of light beams from the MEMS mirror 102 and diffuse the second plurality of light beams onto the HUD reflector 204. The second diffuser portion 216 may convert the second plurality of light beams into divergent light beams by diffusion, by scattering, or by other means. Thus, the second diffuser portion 216 may be used to increase an eye-box size corresponding to the second image. A diffuser may include a randomly scattering transmission or reflection diffuser, a multi-lens array, or micromirror structures leading to a divergence of a light beam that is angularly equivalent to a scattered diffusion of the light beam. Thus, a diffuser may be any structure or assembly of structures that converts a light beam (e.g., a collimated light beam) into a divergent light beam.

The HUD reflector 204 may project the first plurality of light beams received from the first diffuser portion 214 onto a first virtual plane corresponding to a first virtual image distance. The first virtual plane is located at the first virtual image distance at which the first image is to be perceived, for example, by a driver of a vehicle. Additionally, the HUD reflector 204 may be configured to project the second plurality of light beams received from the second diffuser portion 216 onto a second virtual plane corresponding to a second virtual image distance that is different from the first virtual image distance. The second virtual plane is located at the second virtual image distance at which the second image is to be perceived, for example, by the driver. Thus, the first image is configured to be perceived at the first virtual image distance and the second image is configured to be perceived at the second virtual image distance.

The HUD reflector 204 may be arranged to receive the first plurality of light beams and the second plurality of light beams. As a result, the first plurality of light beams may be projected onto a first display FOV of the driver's FOV and the second plurality of light beams may be projected onto a second display FOV of the driver's FOV. The first and second display FOVs correspond to different driver FOVs. While the first plurality of light beams and the second plurality of light beams can partially overlap on the windshield 204 (e.g., in overlapping areas), the first plurality of light beams and the second plurality of light beams do not overlap at the first and the second virtual display distances corresponding to the first display FOV and the second display FOV, respectively. The windshield may receive the first plurality of light beams received from the HUD reflector 204 and project the first image corresponding to the first plurality of light beams onto the first virtual plane. In addition, the windshield may receive the second plurality of light beams received from the HUD reflector 204 and project the second image corresponding to the second plurality of light beams onto the second virtual plane. The first display FOV of the windshield may project the first image into a first line of sight of a driver, and the second display FOV of the windshield may project the second image into a second line of sight of the driver that is different from the first line of sight. As a result, the first image may be in focus when the driver is looking along the first line of sight (e.g., at the dashboard), and the second image may be in focus when the driver is looking along the second line of sight (e.g., at the real-world environment). In some implementations, the first virtual image distance may be less than 2.5 meters and the second virtual image distance may be at least 9.5 meters. As a result, the first virtual plane may be projected to less than 2.5 meters, and the second virtual plane may be projected to optical infinity. Thus, the first light transmitter 108 and the second light transmitter 110 may be configured to project images at different virtual distances in alignment with different focus areas of the driver.

Additional virtual planes may be provided by including additional light transmitters, focus lenses, and diffuser portions that share the MEMS mirror 102. For example, a third light transmitter, a third focus lens, and a third diffuser portion may be provided to project a third plurality of light beams onto a third virtual plane to render a third image to be perceived at a third virtual image distance that is different from the first virtual image distance and the second virtual image distance. Thus, the number of display FOVs and virtual planes may be scaled up by adding additional light transmitters, focus lenses, and diffuser portions that share the MEMS mirror 102.

Based on a configuration of the HUD system 200, projected images may be generated in focus with a particular viewing direction of the driver, with some projected images being generated for near-field virtual distances and some projected images being generated for far-field virtual distances. Each projected image can be generated with a high image quality and a high fidelity for a particular virtual distance. Additionally, since the two or more light transmitters share a single 2D scanner and a single display controller, manufacturing costs can be kept relatively low.

As indicated above, FIG. 2 is provided as an example. Other examples may differ from what is described with regard to FIG. 2. The number and arrangement of components shown in FIG. 2 are provided as an example. In practice, the HUD system 200 may include additional components, fewer components, different components, or differently arranged components than those shown in FIG. 2. Two or more components shown in FIG. 2 may be implemented within a single component, or a single component shown in FIG. 2 may be implemented as multiple, distributed components. Additionally, or alternatively, a set of components (e.g., one or more components) of the HUD system 200 may perform one or more functions described as being performed by another set of components of the HUD system 200.

Figure 3:
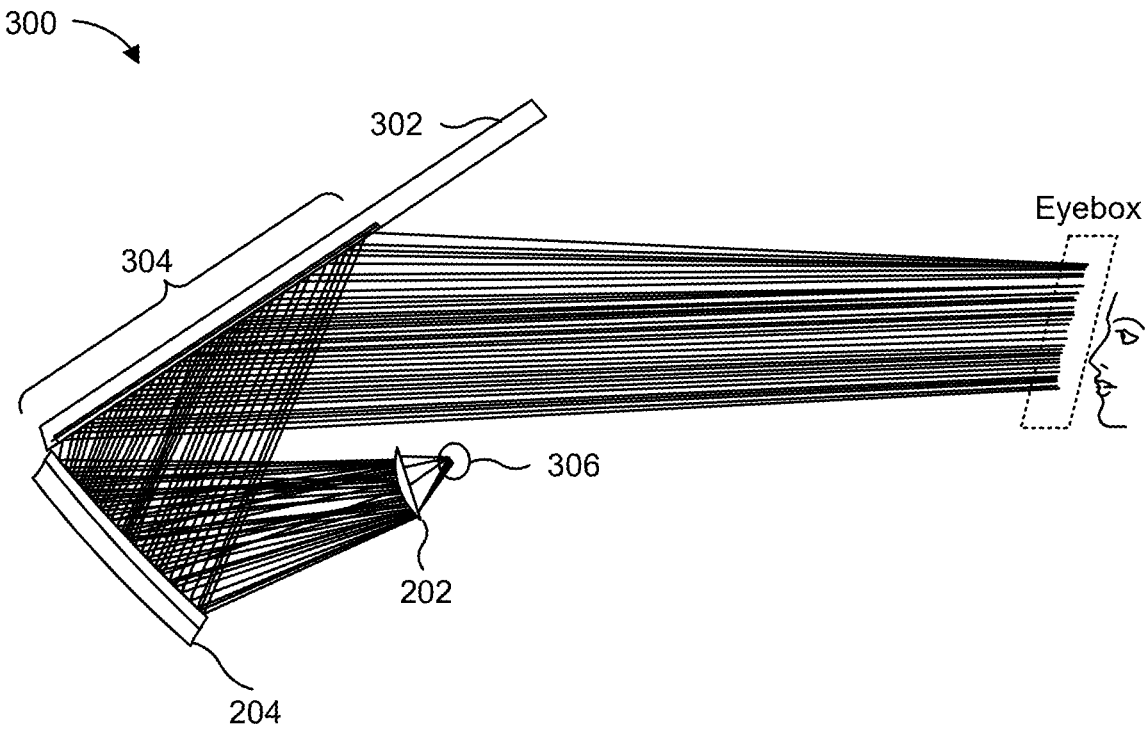
FIG. 3 illustrates an example HUD system according to one or more implementations.

FIG. 3 illustrates an example HUD system 300 according to one or more implementations. The HUD system 300 is similar to the HUD system 200 described in connection with FIG. 2, but additionally includes a windshield 302 of a vehicle. In some implementations, the HUD system 300 includes a windshield reflector 304 that is mounted on or embedded in the windshield 302. The first light transmitter 108, the second light transmitter 110, the first focus lens 210, the second focus lens 212, and the MEMS mirror 102 (e.g., the 2D scanner) may be provided as an image generation unit 306.

The HUD reflector 204 may receive each of the first plurality of light beams from the diffuser 202 and project the first image formed by the first plurality of pixel light beams and a 2D scanning pattern implemented by the MEMS mirror 102 onto the first display area of the windshield 302 (e.g., onto the windshield reflector 304) by reflecting each of the first plurality of light beams onto the windshield 302. The HUD reflector 204 may receive each of the second plurality of light beams from the diffuser 202 and project the second image formed by the second plurality of pixel light beams and the 2D scanning pattern implemented by the MEMS mirror 102 onto the second display area of the windshield 302 (e.g., onto the windshield reflector 304) by reflecting each of the second plurality of light beams onto the windshield 302.

The HUD reflector 204 has a curved body, such as a convex shape or convex contour, that is designed to receive the first and the second plurality of light beams and reflect the first and the second plurality of light beams toward a respective display area of the windshield 302 (e.g., onto a respective area of the windshield reflector 304). The windshield reflector 304 may be configured to reflect each of the first and the second plurality of pixel beams toward a user, at which point the user perceives the projected first image formed by the first plurality of light beams or perceives the projected second image formed by the second plurality of light beams based on a viewing direction of the user. Thus, FIG. 3 illustrates a first full optical path (e.g., a first full transmission path) of the first plurality of light beams, and a second full optical path (e.g., a second full transmission path) of the second plurality of light beams.

The number and arrangement of components shown in FIG. 3 are provided as an example. In practice, the HUD system 300 may include additional components, fewer components, different components, or differently arranged components than those shown in FIG. 3.

Figure 4:
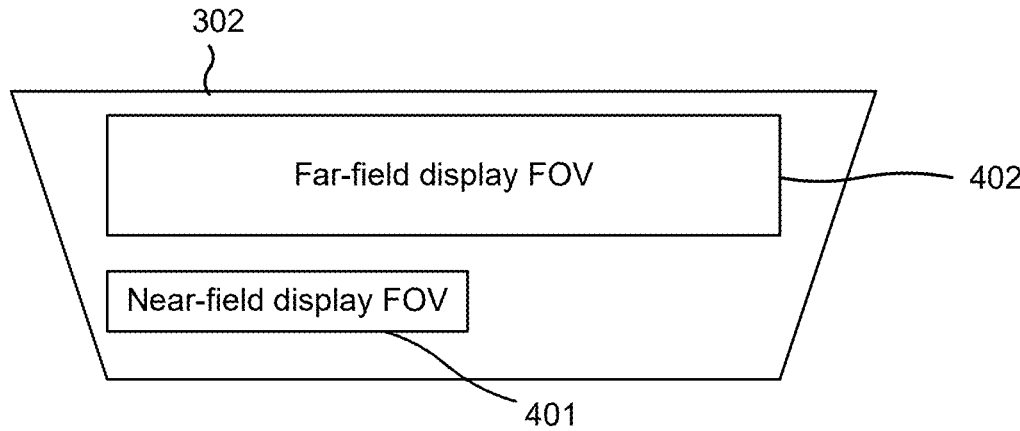
FIG. 4 illustrates an example of a windshield according to one or more implementations.

FIG. 4 illustrates an example of the windshield 302 according to one or more implementations. The windshield 302 includes a near-field display FOV 401 as the first display FOV and a far-field display FOV 402 as the second display FOV. The near-field display FOV 401 and the far-field display FOV 402 may be mutually exclusive fields of the windshield 302 that correspond to different field-of-views of the driver. In other words, the near-field display FOV 401 may project the first image onto the first virtual plane into a first line of sight or a first field-of-view of the driver, and the far-field display FOV 402 may project the second image onto the second virtual plane into a second line of sight or a second field-of-view of the driver.

As indicated above, FIG. 4 is provided as an example. Other examples may differ from what is described with regard to FIG. 4.

The following provides an overview of some Aspects of the present disclosure:

Aspect 1: A HUD system, comprising: a first light transmitter configured to generate a first plurality of light beams corresponding to a first image and transmit the first plurality of light beams on a first optical path; a second light transmitter configured to generate a second plurality of light beams corresponding to a second image and transmit the second plurality of light beams on a second optical path; a 2D scanner arranged on the first optical path and the second optical path, wherein the 2D scanner is configured to receive the first plurality of light beams from the first light transmitter and steer the first plurality of light beams along the first optical path according to a 2D scanning pattern, and wherein the 2D scanner is configured to receive the second plurality of light beams from the second light transmitter and steer the second plurality of light beams along the second optical path according to the 2D scanning pattern; a first focus lens arranged on the first optical path between the first light transmitter and the 2D scanner, wherein the first focus lens is configured to focus each light beam of the first plurality of light beams onto a first focal point located at a first distance downstream from the 2D scanner along the first optical path; and a second focus lens arranged on the second optical path between the second light transmitter and the 2D scanner, wherein the second focus lens is configured to focus each light beam of the second plurality of light beams onto a second focal point located at a second distance downstream from the 2D scanner along the second optical path, and wherein the first distance and the second distance are different.

Aspect 2: The HUD system of Aspect 1, wherein the first focus lens has a first focal length and the second focus lens has a second focal length that is different from the first focal length.

Aspect 3: The HUD system of any of Aspects 1-2, wherein the first focus lens and the second focus lens have a same focal length, wherein the first focus lens is arranged at a third distance from the first light transmitter, wherein the second focus lens is arranged at a fourth distance from the second light transmitter, and wherein the third distance is different from the fourth distance.

Aspect 4: The HUD system of any of Aspects 1-3, wherein the first plurality of light beams and the second plurality of light beams are collimated beams of pixel light.

Aspect 5: The HUD system of any of Aspects 1-4, further comprising: a HUD reflector; and at least one diffuser arranged at the first focal point and at the second focal point, wherein the at least one diffuser is configured to receive the first plurality of light beams from the 2D scanner and diffuse the first plurality of light beams onto the HUD reflector, wherein the at least one diffuser is configured to receive the second plurality of light beams from the 2D scanner and diffuse the second plurality of light beams onto the HUD reflector, wherein the HUD reflector is configured to project the first plurality of light beams received from the at least one diffuser onto a first virtual plane corresponding to a first virtual image distance, and wherein the HUD reflector is configured to project the second plurality of light beams received from the at least one diffuser onto a second virtual plane corresponding to a second virtual image distance that is different from the first virtual image distance.

Aspect 6: The HUD system of Aspect 5, wherein the at least one diffuser includes a single diffuser comprising a first diffuser portion arranged at the first focal point and a second diffuser portion arranged at the second focal point.

Aspect 7: The HUD system of Aspect 5, wherein the at least one diffuser includes a first diffuser arranged at the first focal point and a second diffuser arranged at the second focal point.

Aspect 8: The HUD system of claim 5, further comprising: a windshield configured to receive the first plurality of light beams from the HUD reflector producing a first display field and project the first image corresponding to the first plurality of light beams onto the first virtual plane, and wherein the windshield is configured to receive the second plurality of light beams received from the HUD reflector producing a second display field and project the second image corresponding to the second plurality of light beams onto the second virtual plane.

Aspect 9: The HUD system of claim 8, wherein the first display field is a near-field area field and the first virtual image distance is less than 2.5 meters, and wherein the second display field is a far-field area field and the second virtual image distance is at least 9.5 meters.

Aspect 10: The HUD system of claim 8, wherein the first display field is configured to project the first image into a first line of sight of a user, and wherein the second display field is configured to project the second image into a second line of sight of the user that is different from the first line of sight.

Aspect 11: The HUD system of Aspect 5, wherein the first image is configured to be perceived at the first virtual image distance and the second image is configured to be perceived at the second virtual image distance.

Aspect 12: A HUD system, comprising: a first light transmitter configured to generate a first plurality of light beams corresponding to a first virtual plane and transmit the first plurality of light beams on a first optical path, wherein the first virtual plane is located at a first virtual image distance at which a first image is to be perceived; a second light transmitter configured to generate a second plurality of light beams corresponding to a second virtual plane and transmit the second plurality of light beams on a second optical path, wherein the second virtual plane is located at a second virtual image distance at which a second image is to be perceived, and wherein the second virtual image distance is different from the first virtual image distance; a 2D scanner arranged on the first optical path and the second optical path, wherein the 2D scanner is configured to receive the first plurality of light beams from the first light transmitter and steer the first plurality of light beams along the first optical path according to a 2D scanning pattern, and wherein the 2D scanner is configured to receive the second plurality of light beams from the second light transmitter and steer the second plurality of light beams along the second optical path according to the 2D scanning pattern; a HUD reflector; and at least one diffuser arranged at a first focal point of the first plurality of light beams and at a second focal point of the second plurality of light beams, wherein the at least one diffuser is configured to receive the first plurality of light beams from the 2D scanner and diffuse the first plurality of light beams onto the HUD reflector, wherein the at least one diffuser is configured to receive the second plurality of light beams from the 2D scanner and diffuse the second plurality of light beams onto the HUD reflector, wherein the HUD reflector is configured to project the first plurality of light beams received from the at least one diffuser onto the first virtual plane to render the first image to be perceived at the first virtual image distance, and wherein the HUD reflector is configured to project the second plurality of light beams received from the at least one diffuser onto the second virtual plane to render the second image to be perceived at the second virtual image distance.

Aspect 13: The HUD system of Aspect 12, wherein the first virtual image distance is less than 2.5 meters, and wherein the second virtual image distance is at least 9.5 meters.

Aspect 14: The HUD system of any of Aspects 12-13, wherein the first virtual plane is projected to less than 2.5 meters, and wherein the second virtual plane is projected to optical infinity.

Aspect 15: The HUD system of any of Aspects 12-14, wherein: the first light transmitter is a first RGB transmitter comprising a red light source, a green light source, and a blue light source, and the first image is a first RGB image, and the second light transmitter is a second RGB transmitter, and the second image is a second RGB image.

Aspect 16: The HUD system of any of Aspects 12-15, wherein the HUD reflector includes a first reflective region and a second reflective region that is different from the first reflective region, and the HUD reflector is configured to receive the first plurality of light beams at the first reflective region and receive the second plurality of light beams at the second reflective region.

Aspect 17: The HUD system of claim 12, further comprising: a windshield configured to receive the first plurality of light beams from the HUD reflector producing a first display field and project the first image corresponding to the first plurality of light beams onto the first virtual plane, and wherein the windshield is configured to receive the second plurality of light beams received from the HUD reflector producing a second display field and project the second image corresponding to the second plurality of light beams onto the second virtual plane.

Aspect 18: The HUD system of claim 17, wherein the first display field is configured to project the first image into a first line of sight of a user, and wherein the second display field is configured to project the second image into a second line of sight of the user that is different from the first line of sight.

Aspect 19: The HUD system of claim 17, wherein the first display field and the second display field are mutually exclusive fields.

Aspect 20: The HUD system of Aspect 17, further comprising: a first focus lens arranged on the first optical path and configured to focus each light beam of the first plurality of light beams at the first focal point; and a second focus lens arranged on the second optical path and configured to focus each light beam of the second plurality of light beams at the second focal point.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

For example, although implementations described herein relate to MEMS devices with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A head-up display (HUD) system, comprising:
a first light transmitter configured to generate a first plurality of light beams corresponding to a first image and transmit the first plurality of light beams on a first optical path;
a second light transmitter configured to generate a second plurality of light beams corresponding to a second image and transmit the second plurality of light beams on a second optical path;
a two-dimensional (2D) scanner arranged on the first optical path and the second optical path, wherein the 2D scanner is configured to receive the first plurality of light beams from the first light transmitter and steer the first plurality of light beams along the first optical path according to a 2D scanning pattern, and wherein the 2D scanner is configured to receive the second plurality of light beams from the second light transmitter and steer the second plurality of light beams along the second optical path according to the 2D scanning pattern;
a first focus lens arranged on the first optical path between the first light transmitter and the 2D scanner, wherein the first focus lens is configured to focus each light beam of the first plurality of light beams onto a first focal point located at a first distance downstream from the 2D scanner along the first optical path; and
a second focus lens arranged on the second optical path between the second light transmitter and the 2D scanner, wherein the second focus lens is configured to focus each light beam of the second plurality of light beams onto a second focal point located at a second distance downstream from the 2D scanner along the second optical path, and wherein the first distance and the second distance are different.

2. The HUD system of claim 1, wherein the first focus lens has a first focal length and the second focus lens has a second focal length that is different from the first focal length.

3. The HUD system of claim 1, wherein the first focus lens and the second focus lens have a same focal length, wherein the first focus lens is arranged at a third distance from the first light transmitter,
wherein the second focus lens is arranged at a fourth distance from the second light transmitter, and
wherein the third distance is different from the fourth distance.

4. The HUD system of claim 1, wherein the first plurality of light beams and the second plurality of light beams are collimated beams of pixel light.

5. The HUD system of claim 1, further comprising:
a HUD reflector; and
at least one diffuser arranged at the first focal point and at the second focal point,
wherein the at least one diffuser is configured to receive the first plurality of light beams from the 2D scanner and diffuse the first plurality of light beams onto the HUD reflector,
wherein the at least one diffuser is configured to receive the second plurality of light beams from the 2D scanner and diffuse the second plurality of light beams onto the HUD reflector,
wherein the HUD reflector is configured to project the first plurality of light beams received from the at least one diffuser onto a first virtual plane corresponding to a first virtual image distance, and
wherein the HUD reflector is configured to project the second plurality of light beams received from the at least one diffuser onto a second virtual plane corresponding to a second virtual image distance that is different from the first virtual image distance.

6. The HUD system of claim 5, wherein the at least one diffuser includes a single diffuser comprising a first diffuser portion arranged at the first focal point and a second diffuser portion arranged at the second focal point.

7. The HUD system of claim 5, wherein the at least one diffuser includes a first diffuser arranged at the first focal point and a second diffuser arranged at the second focal point.

8. The HUD system of claim 5, further comprising:
a windshield configured to receive the first plurality of light beams from the HUD reflector producing a first display field and project the first image corresponding to the first plurality of light beams onto the first virtual plane, and
wherein the windshield is configured to receive the second plurality of light beams from the HUD reflector producing a second display field and project the second image corresponding to the second plurality of light beams onto the second virtual plane.

9. The HUD system of claim 8, wherein the first display field is a near-field field and the first virtual image distance is less than 2.5 meters, and
wherein the second display field is a far-field field and the second virtual image distance is at least 9.5 meters.

10. The HUD system of claim 8, wherein the first display field is configured to project the first image into a first line of sight of a user, and
wherein the second display field is configured to project the second image into a second line of sight of the user that is different from the first line of sight.

11. The HUD system of claim 5, wherein the first image is configured to be perceived at the first virtual image distance and the second image is configured to be perceived at the second virtual image distance.

12. A head-up display (HUD) system, comprising:
a first light transmitter configured to generate a first plurality of light beams corresponding to a first virtual plane and transmit the first plurality of light beams on a first optical path, wherein the first virtual plane is located at a first virtual image distance at which a first image is to be perceived;

a second light transmitter configured to generate a second plurality of light beams corresponding to a second virtual plane and transmit the second plurality of light beams on a second optical path, wherein the second virtual plane is located at a second virtual image distance at which a second image is to be perceived, and wherein the second virtual image distance is different from the first virtual image distance;

a two-dimensional (2D) scanner arranged on the first optical path and the second optical path, wherein the 2D scanner is configured to receive the first plurality of light beams from the first light transmitter and steer the first plurality of light beams along the first optical path according to a 2D scanning pattern, and wherein the 2D scanner is configured to receive the second plurality of light beams from the second light transmitter and steer the second plurality of light beams along the second optical path according to the 2D scanning pattern;

a HUD reflector; and at least one diffuser arranged at a first focal point of the first plurality of light beams and at a second focal point of the second plurality of light beams, wherein the at least one diffuser is configured to receive the first plurality of light beams from the 2D scanner and diffuse the first plurality of light beams onto the HUD reflector, wherein the at least one diffuser is configured to receive the second plurality of light beams from the 2D scanner and diffuse the second plurality of light beams onto the HUD reflector, wherein the HUD reflector is configured to project the first plurality of light beams received from the at least one diffuser onto the first virtual plane to render the first image to be perceived at the first virtual image distance, and wherein the HUD reflector is configured to project the second plurality of light beams received from the at least one diffuser onto the second virtual plane to render the second image to be perceived at the second virtual image distance.

13. The HUD system of claim 12, wherein the first virtual image distance is less than 2.5 meters, and wherein the second virtual image distance is at least 9.5 meters.

14. The HUD system of claim 12, wherein the first virtual plane is projected to less than 2.5 meters, and wherein the second virtual plane is projected to optical infinity.

15. The HUD system of claim 12, wherein:

the first light transmitter is a first red-green-blue (RGB) transmitter comprising a red light source, a green light source, and a blue light source, and the first image is a first RGB image, and the second light transmitter is a second RGB transmitter, and the second image is a second RGB image.

16. The HUD system of claim 12, wherein the HUD reflector includes a first reflective region and a second reflective region that is different from the first reflective region, and the HUD reflector is configured to receive the first plurality of light beams at the first reflective region and receive the second plurality of light beams at the second reflective region.

17. The HUD system of claim 12, further comprising:

a windshield configured to receive the first plurality of light beams from the HUD reflector producing a first display field and project the first image corresponding to the first plurality of light beams onto the first virtual plane, and wherein the windshield is configured to receive the second plurality of light beams from the HUD reflector producing a second display field and project the second image corresponding to the second plurality of light beams onto the second virtual plane.

18. The HUD system of claim 17, wherein the first display field is configured to project the first image into a first line of sight of a user, and wherein the second display field is configured to project the second image into a second line of sight of the user that is different from the first line of sight.

19. The HUD system of claim 17, wherein the first display field and the second display field are mutually exclusive fields.

20. The HUD system of claim 17, further comprising:

a first focus lens arranged on the first optical path and configured to focus each light beam of the first plurality of light beams at the first focal point; and a second focus lens arranged on the second optical path and configured to focus each light beam of the second plurality of light beams at the second focal point.

\* \* \* \* \*